US012639838B2

(12) United States Patent
Guo et al.

(10) Patent No.: US 12,639,838 B2
(45) Date of Patent: May 26, 2026

(54) FLATNESS DETECTING METHOD OF ROAD, COMPUTING APPARATUS, AND COMPUTER-READABLE MEDIUM

(71) Applicant: Wistron Corporation, New Taipei City (TW)

(72) Inventors: Jiun-In Guo, Hsinchu (TW); Kuang-Yu Cheng, Hsinchu (TW)

(73) Assignee: Wistron Corporation, New Taipei City (TW)

( * ) Notice: Subject to any disclaimer, the term of this patent is extended or adjusted under 35 U.S.C. 154(b) by 285 days.

(21) Appl. No.: 18/465,991

(22) Filed: Sep. 13, 2023

(65) Prior Publication Data

US 2025/0029267 A1     Jan. 23, 2025

(30) Foreign Application Priority Data

Jul. 17, 2023    (TW) ................................. 112126537

(51) Int. Cl.
　　*G06T 7/50*　　　　(2017.01)
　　*G06T 7/11*　　　　(2017.01)
(52) U.S. Cl.
　　CPC .................. *G06T 7/50* (2017.01); *G06T 7/11* (2017.01); *G06T 2207/10028* (2013.01); *G06T 2207/30256* (2013.01)
(58) Field of Classification Search
　　CPC .......................... G06T 7/50; G06T 7/11; G06T 2207/10028; G06T 2207/30256
　　See application file for complete search history.

(56) References Cited

U.S. PATENT DOCUMENTS

| | | | | |
|---|---|---|---|---|
| 11,645,775 | B1 * | 5/2023 | Ganguli | G06T 7/593 |
| | | | | 382/103 |
| 2014/0073002 | A1 * | 3/2014 | Yamauchi | C12N 5/0696 |
| | | | | 435/34 |
| 2020/0250984 | A1 * | 8/2020 | Kundu | B60W 10/20 |
| 2020/0293057 | A1 * | 9/2020 | Reid | B60W 60/001 |
| 2021/0383269 | A1 * | 12/2021 | Zhou | G06N 3/0464 |
| 2022/0057806 | A1 * | 2/2022 | Guo | G06V 20/58 |

(Continued)

FOREIGN PATENT DOCUMENTS

| | | |
|---|---|---|
| CN | 113140002 | 7/2021 |
| CN | 115205809 | 10/2022 |

(Continued)

*Primary Examiner* — Stephen R Koziol
(74) *Attorney, Agent, or Firm* — JCIPRNET

(57) ABSTRACT

A flatness detecting method of road, a computing apparatus, and a computer-readable medium are provided. In the method, depth information is obtained. The depth information includes depth values corresponding to a plurality of pixels. The depth information is converted into a height relation map. Height values of the pixels in the height relation map are converted from the corresponding depth values, and the height value of each of the pixels is related to a height of a ground. According to the height relation map, a flatness category corresponding to the pixels is determined via a semantic segmentation model. The semantic segmentation model is trained with an association 10 between one or a plurality of reference heights and corresponding flatness categories. Accordingly, a road condition may be effectively detected.

18 Claims, 6 Drawing Sheets

(56)  References Cited

U.S. PATENT DOCUMENTS

| | | | | |
|---|---|---|---|---|
| 2023/0186638 | A1* | 6/2023 | Klingenhöfer | G06V 10/82 |
| | | | | 382/104 |
| 2023/0252658 | A1* | 8/2023 | Cai | G06T 7/50 |
| | | | | 382/100 |
| 2024/0046495 | A1* | 2/2024 | Chien | G06T 7/60 |
| 2024/0312021 | A1* | 9/2024 | Muntean | G06V 20/588 |
| 2024/0412534 | A1* | 12/2024 | Yogamani | G06V 20/58 |
| 2025/0153593 | A1* | 5/2025 | Khuntia | B60W 20/12 |

FOREIGN PATENT DOCUMENTS

| | | | | |
|---|---|---|---|---|
| TW | 201620468 | 6/2016 | | |
| TW | I629453 | 7/2018 | | |
| WO | WO-2021097087 A1 * | 5/2021 | | G06N 3/084 |

* cited by examiner

401

402

403

404

FLATNESS DETECTING METHOD OF ROAD, COMPUTING APPARATUS, AND COMPUTER-READABLE MEDIUM

CROSS-REFERENCE TO RELATED APPLICATION

This application claims the priority benefit of Taiwan application serial no. 112126537, filed on Jul. 17, 2023. The entirety of the above-mentioned patent application is hereby incorporated by reference herein and made a part of this specification.

BACKGROUND OF THE INVENTION

Field of the Invention

The invention relates to a detecting technique, and in particular to a flatness detecting method of road, a computing apparatus, and a computer-readable medium.

Description of Related Art

With the increase of the elderly population, how to provide a safer auxiliary transportation tool for the elderly is one of the important issues today. Therefore, the detection of road information becomes extremely important, so as to know whether the road is smooth, and then improve the safety of the auxiliary transportation tool.

SUMMARY OF THE INVENTION

The invention provides a flatness detecting method of road, a computing apparatus, and a computer-readable medium, and road detection is performed via the fusion of a stereo vision technique and a depth learning technique.

A flatness detecting method of road of an embodiment of the invention includes (but not limited to) the following steps. Depth information is obtained. The depth information includes depth values corresponding to a plurality of pixels. The depth information is converted into a height relation map. Height values of the pixels in the height relation map are converted from the corresponding depth values, and the height value of each of the pixels is related to a height of the ground. According to the height relation map, flatness categories corresponding to the pixels are determined via a semantic segmentation model. The semantic segmentation model is trained with an association between one or a plurality of reference heights and corresponding flatness categories.

A computing apparatus of an embodiment of the invention includes a memory and a processor. The memory stores a program code. The processor is coupled to the memory. The processor loads the program code and executes the following steps: obtaining depth information, converting the depth information into a height relation map, and determining flatness categories corresponding to the pixels via a semantic segmentation model according to the height relation map. The depth information includes depth values corresponding to a plurality of pixels. Height values of the pixels in the height relation map are converted from the corresponding depth values, and the height value of each of the pixels is related to a height of a ground. The semantic segmentation model is trained with an association between one or a plurality of reference heights and corresponding flatness categories.

A non-transitory computer-readable medium of an embodiment of the invention loads a program code via a processor to perform the following steps: obtaining depth information, converting the depth information into a height relation map, and determining flatness categories corresponding to the pixels via a semantic segmentation model according to the height relation map. The depth information includes depth values corresponding to a plurality of pixels. Height values of the pixels in the height relation map are converted from the corresponding depth values, and the height value of each of the pixels is related to a height of a ground. The semantic segmentation model is trained with an association between one or a plurality of reference heights and corresponding flatness categories.

Based on the above, according to the flatness detecting method of road, the computing apparatus, and the computer-readable medium of the embodiments of the invention, the depth map is converted into the height relation map, and the flatness category is identified via the speech segmentation model. In this way, the number of sensors may be significantly reduced, and more accurate road information (for example, the data of the ups and downs of the road or distance information) may also be obtained. In addition, a dangerous protrusion or the degree of depression thereof may be distinguished, and a slope may be determined.

Several exemplary embodiments accompanied with figures are described in detail below to further describe the disclosure in details.

DESCRIPTION OF THE EMBODIMENTS

Figure 1:
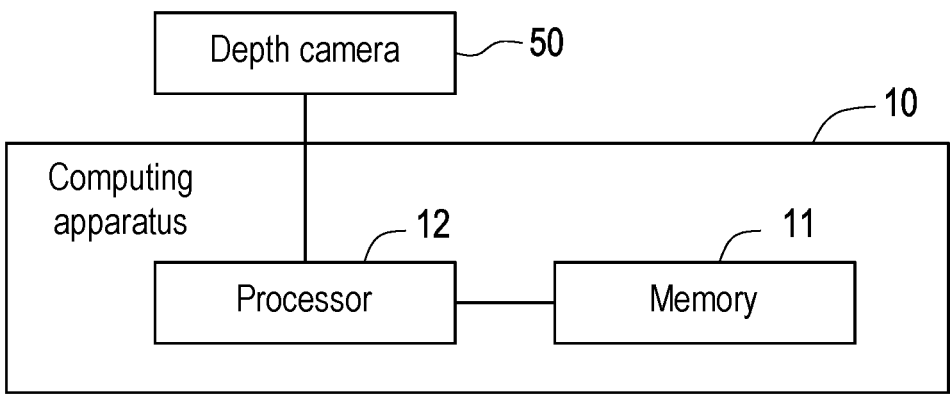
FIG. 1 is a device block diagram of a computing apparatus according to an embodiment of the invention.

FIG. 1 is a device block diagram of a computing apparatus 10 according to an embodiment of the invention. Please refer to FIG. 1, the computing apparatus 10 includes (but not limited to) a memory 11 and a processor 12. The computing apparatus 10 may be one or more desktop computers, notebook computers, smart phones, tablet computers, wearable apparatuses, servers, or other electronic apparatuses.

The memory 11 may be any form of a fixed or movable random-access memory (RAM), read-only memory (ROM), flash memory, traditional hard-disk drive (HDD), solid-state drive (SSD), or similar devices. In an embodiment, the memory 11 is configured to store a program code, a software module, a configuration, data, or a file (e.g., depth value, height value, or calculation value), which will be described in detail in a subsequent embodiment.

The processor 12 is coupled to the memory 11. The processor 12 may be a central processing unit (CPU), a graphics processing unit (GPU), or other programmable general-purpose or special-purpose microprocessors, digital signal processors (DSPs), programmable controllers, field-programmable gate arrays (FPGAs), application-specific integrated circuits (ASICs), neural network accelerators, or other similar devices or a combination of the above devices. In an embodiment, the processor 12 is configured to execute all or a portion of the operations of the computing apparatus 10, and may load and execute various program codes, software modules, files, and data stored in the memory 11.

In an embodiment, the computing apparatus 10 is connected to the depth camera 50 in a wired or wireless manner, such as via Wi-Fi, mobile network, Bluetooth, or other wireless communication techniques, or via Ethernet, optical fiber network, USB, or other wired communication techniques. In another embodiment, the computing apparatus 10 has a built-in or external depth camera 50. The depth camera 50 may be a sensor based on Time of Flight (ToF), structured light, or radar. In an embodiment, the depth camera 50 is configured to obtain depth information. The depth information (or depth map) includes depth values corresponding to a plurality of pixels. For example, based on the specification of the sensing device of the depth camera 50, the depth information is a depth map with 1920×1080 pixels, and each of the pixels corresponds to one depth value. The depth value reflects the distance of the depth camera 50 relative to the object. It should be noted that the number of pixels and the size of the depth information may still be changed according to actual needs.

In some embodiments, the depth camera 50 is mounted on a mobile vehicle. The mobile vehicle may be moved autonomously or under control. For example, the mobile vehicle is an automated guided vehicle (AGV), an autonomous mobile robot (AMR), an electric vehicle, a car, or a bicycle.

Hereinafter, the method described in an embodiment of the present is described with various apparatuses, devices, and modules in the computing apparatus 10. Each of the processes of the present method may be adjusted according to embodiment conditions and is not limited thereto.

Figure 2:
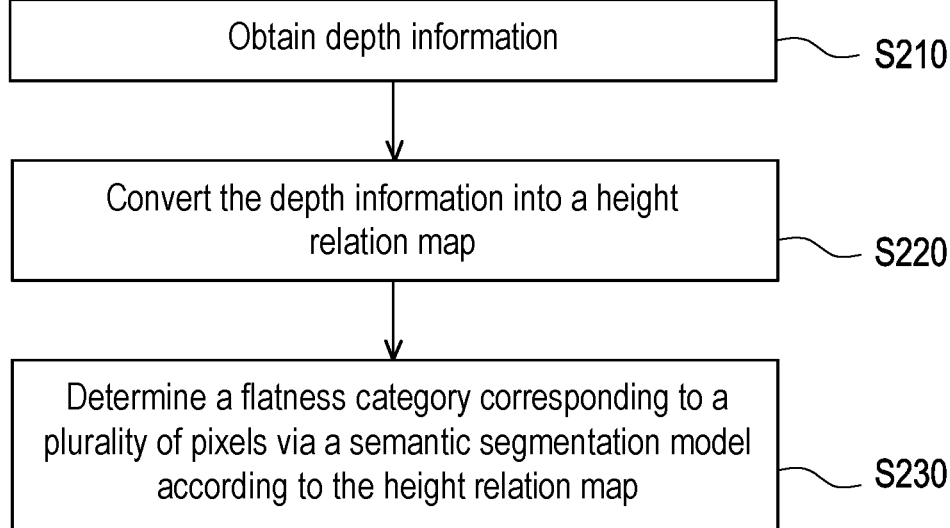
FIG. 2 is a flowchart of a flatness detecting method of road according to an embodiment of the invention.

FIG. 2 is a flowchart of a flatness detecting method of road according to an embodiment of the invention. Referring to FIG. 2, the processor 12 obtains depth information (step S210). As described above, the depth information includes depth values corresponding to a plurality of pixels, and may be called a depth map. In an embodiment, the depth camera 50 may photograph the road. That is, the road is located within the field of view (FOV) of the depth camera 50. In addition, in some embodiments, the depth camera 50 mounted on the mobile vehicle may take pictures of different regions to be measured on the road while moving.

The processor 12 converts the depth information into a height relation map (step S220). Specifically, the height relation map includes a plurality of pixels corresponding to the depth information. For example, if the depth information is a depth map with 1920×1080 pixels, then the height relation map includes height values with 1920×1080 pixels.

The height values of the plurality of pixels in the height relation map are converted by the corresponding depth values. The depth value of one or a plurality of pixels may be converted into a height value. The height value of each of the pixels in the height relation map is relative to the height of the ground. Depression, protrusion, and/or inclination of the ground are factors affecting the flatness of the ground.

The factors result in a difference in height relative to the (flat) ground. Therefore, the height value may be used as an index to determine the flatness.

Figure 3:
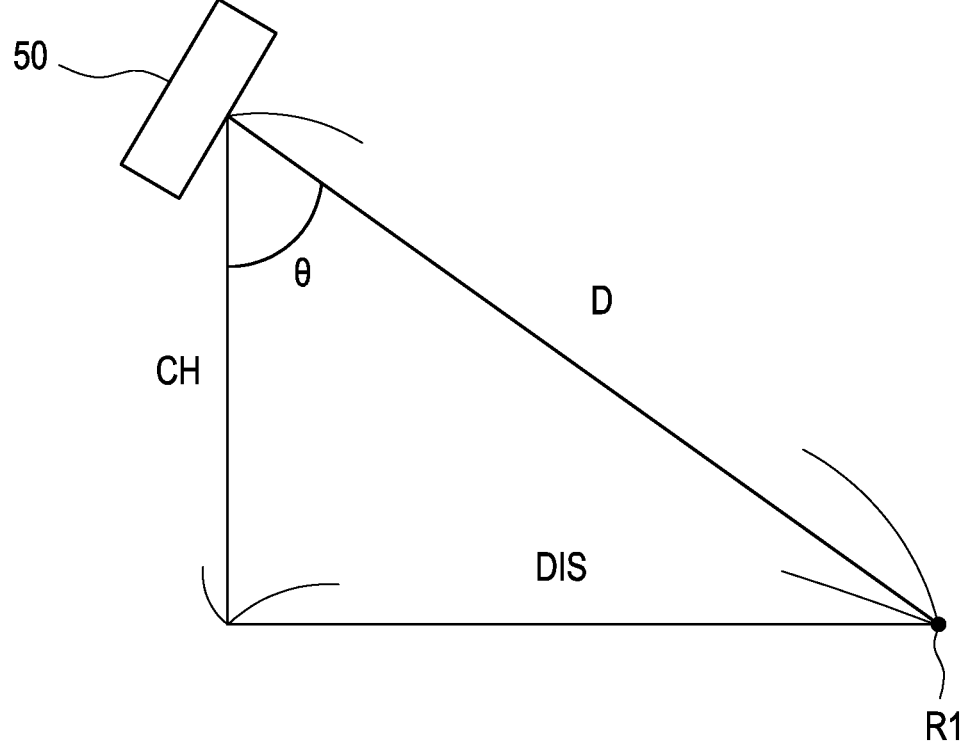
FIG. 3 is a schematic diagram of depth values, height values, and projection angles according to an embodiment of the invention.

FIG. 3 is a schematic diagram of depth values, height values, and projection angles according to an embodiment of the invention. Please refer to FIG. 3, a sensing height CH is the height of the depth camera 50 obtaining the depth information relative to the height of the ground or the height relative to the ground when obtaining the depth information, a depth value D is the depth value of a certain pixel (hereinafter referred to as the first pixel) in the depth information corresponding to a region R1 to be measured (for example, one point or one region, an obstacle, or any object on the road), and a distance DIS is the distance between the standing point of the depth camera 50 on the road and the region R1 to be measured.

In an embodiment, the processor 12 may determine the projection height of the depth value of the first pixel in the plurality of pixels under the projection angle. Taking FIG. 3 as an example, the processor 12 may define the depth value D of the first pixel as the length of the first side of the triangle, define the projection height as the length of the second side of the triangle, and define a projection angle θ as the included angle between the first side and the second side. That is, the projection height is the projected length of the first side to the second side under the condition that the first side and the second side have the projection angle θ.

The processor 12 may determine the height value of the first pixel in the height relation map according to the difference between the sensing height CH and the projection height. That is, the difference between the sensing height CH and the projection height is the height value. The mathematical expression of the height value H is:

$$H = CH - D * \text{Cos}(\theta). \tag{1}$$

Since the sensing height CH is a known length, the difference between the sensing height CH and the projection height D*Cos(θ) (that is, the difference between the sensing height CH and the projection height) may reflect the height of the region R1 to be measured relative to the road where the depth camera 50 is located, and accordingly may learn that the region R1 to be measured is lower than, higher than, or the same height as the road where the depth camera 50 is located. For example, if the projection height is equal to the sensing height, the region R1 to be measured is also higher than the road where the depth camera 50 is located. If the projection height is less than the sensing height, the region R1 to be measured is higher than the road where the depth camera 50 is located. If the projection height is greater than the sensing height, the region R1 to be measured is lower than the road where the depth camera 50 is located.

In an embodiment, the processor 12 may determine the distance DIS of the region R1 to be measured corresponding to the first pixel according to the projection angle and the first side (the side corresponding to the depth value D). The mathematical expression of the distance DIS is:

$$DIS = D * \text{Sin}(\theta). \tag{2}$$

If the region R1 to be measured is a portion of a suspended object or an obstacle, the above formula (2) may be used to determine the spacing from the suspended object or obstacle.

The projection angle is derived based on the position of the first pixel in the plurality of pixels in the depth map. In an embodiment, the processor 12 may obtain reference depth information. The reference depth information includes depth values of a plurality of pixels when the ground is flat. The reference depth information is the depth information sensed by the depth camera 50 in advance on a flat ground and at a defined sensing height. The depth map that refers to the depth information reflects the depth value of the flat ground.

The processor 12 matches the reference depth information with a plurality of reference angles to obtain a matching result. Each of the pixels in the matching result matches one reference angle. The reference depth information is a depth map obtained by sensing a flat road. The processor 12 may define the depth value of any pixel in the reference depth information to correspond to the length of the hypotenuse of the reference triangle, and define the sensing height to correspond to the length of the adjacent side of the reference triangle. The included angle between the hypotenuse and the adjacent side is the reference angle. The processor 12 may determine the corresponding reference angle according to the length of the hypotenuse and the length of the adjacent side. Since the reference depth information is for sensing flat ground, all pixels located on the same horizontal line in the depth map corresponding to the reference depth information have the same depth value. Furthermore, the pixels located on the same horizontal line also correspond to the same reference angle, thereby matching the pixels to the corresponding reference angles. By determining the reference angles corresponding to all the horizontal lines in the depth map, all the pixels in the reference depth information may be matched to the corresponding reference angles.

Next, the processor 12 may determine the projection angle corresponding to the first pixel according to the matching result. For example, the processor 12 may obtain the coordinates of the first pixel corresponding to the vertical axis in the two-dimensional coordinates, and find out the reference angle corresponding to the same horizontal line from the matching result according to the horizontal line corresponding to the coordinates. The found reference angle may be used as the projection angle of the first pixel.

Referring to FIG. 2, the processor 12 determines flatness categories corresponding to the pixels via a semantic segmentation model according to the height relation map (step S230). Specifically, the semantic segmentation algorithm may be used to classify all pixels in an image. Compared with the object detection algorithm, the semantic segmentation algorithm is not limited by the bounding box, and may determine the corresponding categories of all pixels separately. Since the road may have an irregular shape, the semantic segmentation algorithm is more suitable for road detection than the object detection algorithm, and provides better computing efficiency. The semantic segmentation algorithm may be TriSDNet, DeconvNet, ReNet, pix2pix, HRNet, or other algorithms.

The semantic segmentation model is trained with an association between one or a plurality of reference heights and corresponding flatness categories. Based on the semantic segmentation algorithm, the relationship between the training samples and the corresponding labels or true results may be analyzed to obtain the rules, so as to predict unknown data via the rules. For the preparation of training samples, the depth camera 50 is used to actually sense the road at a specific sensing height, and obtain depth information for training. The reference heights of all pixels in the reference height relation map are converted from the corresponding depth values in the depth information used for training. Regarding the conversion from the depth value to the reference height, reference may be made to the above conversion from the depth value to the height value, which is not repeated herein. In addition, the corresponding true flatness category is marked for each of the pixels in the reference height relation map. The semantic segmentation model is a machine learning model constructed after learning based on the above training samples and marked results/ true results, and infers based on the evaluation data (for example, the height relation map obtained in step S220). In some application scenarios, the trained semantic segmentation model may achieve preset accuracy standards.

In an embodiment, the flatness categories predicted/output by the semantic segmentation model include protrusion, depression, slope up, and slope down. Protrusion indicates more elevation than a flat road over a shorter distance. Depression indicates more depression than a flat road over a shorter distance. Slope up indicates a gradual increase over a longer distance compared to a flat road. Slope down indicates a gradual decrease over a longer distance compared to a flat road. In some embodiments, the flatness category further includes background. The background represents objects that are not on the road or beyond the detectable distance.

Figure 4A:
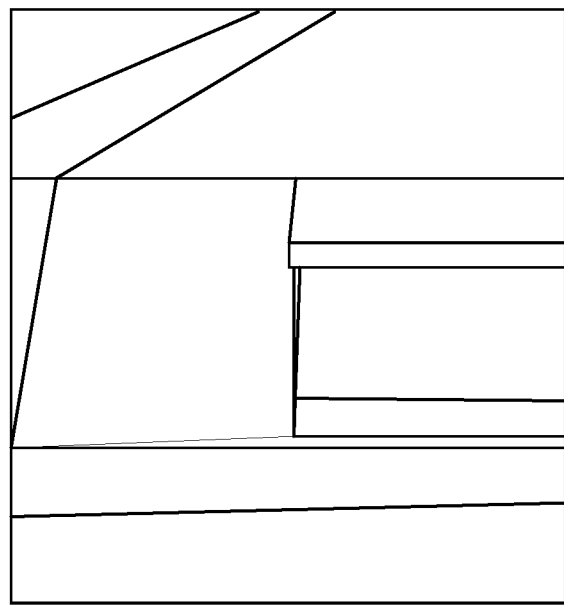
FIG. 4A and FIG. 4B are schematic diagrams of flatness detection and verification according to an embodiment of the invention.
Figure 4B:
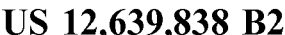
Figure 4B:
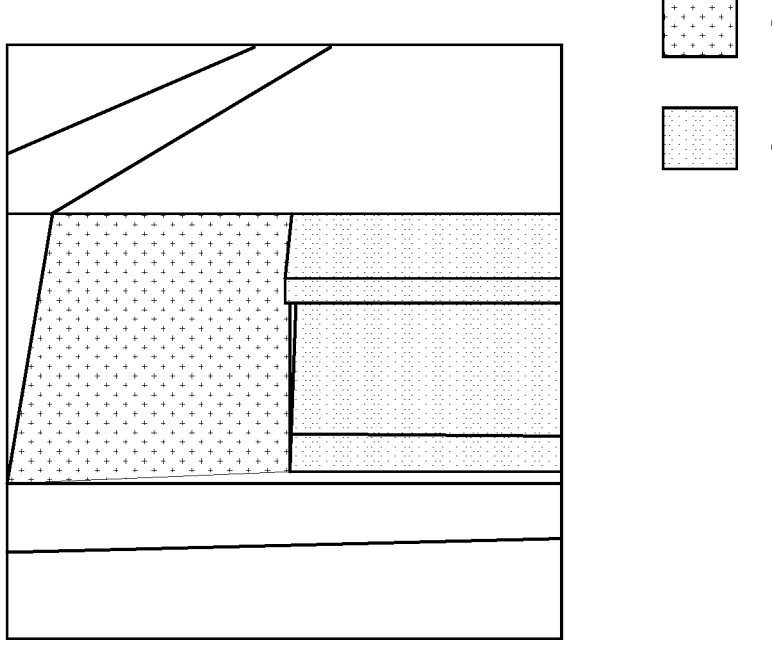

FIG. 4A and FIG. 4B are schematic diagrams of flatness detection and verification according to an embodiment of the invention. Please refer to FIG. 4A and FIG. 4B, FIG. 4A is an actual road corresponding to the depth map captured by the depth camera 50. FIG. 4B shows detected slope up 401 and protrusion 402 on the actual road of FIG. 4A. The slope up 401 may correspond to the slope up of the actual road, and the protrusion 402 may correspond to the step up of the actual road. In addition, the distance to the slope up and the step up may also be determined based on formula (2).

Figure 4C:
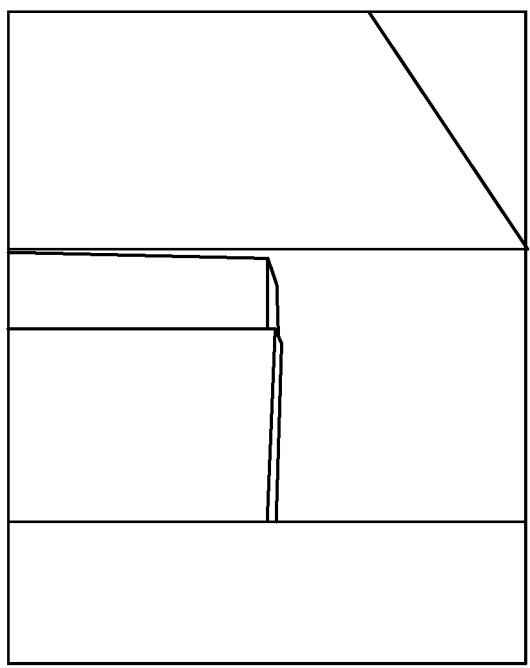
FIG. 4C and FIG. 4D are schematic diagrams of flatness detection and verification according to another embodiment of the invention.
Figure 4D:
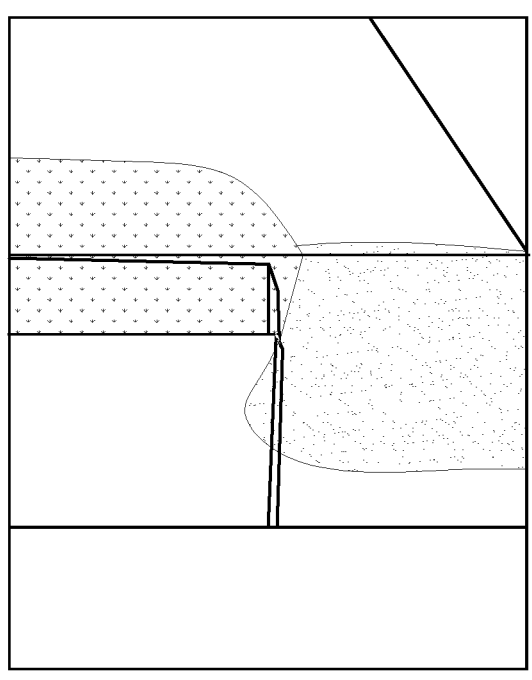

FIG. 4C and FIG. 4D are schematic diagrams of flatness detection and verification according to another embodiment of the invention. Please refer to FIG. 4C and FIG. 4D, FIG. 4C is an actual road corresponding to the depth map captured by the depth camera 50. FIG. 4D shows detected depression 403 and slope down 404 of the actual road of FIG. 4C. The depression 403 may correspond to the step down of the actual road, and the slope down 404 may correspond to the slope down of the actual road. In addition, the distance to the slope down and the step down may also be determined based on formula (2).

In an embodiment, the processor 12 may divide the plurality of pixel regions in the height relation map into a plurality of regions, and determine the flatness categories corresponding to the pixels in the regions via the semantic segmentation model. Since there may be a plurality of flatness categories within the sensing range of the depth camera 50 at the same time, the sensing range may be divided into a plurality of sub-ranges. The sub-ranges respectively correspond to the plurality of regions. For example, the sensing range is evenly divided into left, center, and right regions. For the plurality of regions, when a protrusion or depression is detected in any region, it is helpful for the user to choose the direction corresponding to the other regions to continue traveling, so as to avoid collisions with an obstacle. It should be noted that the number and size of regions may be changed according to actual needs.

Figure 5:
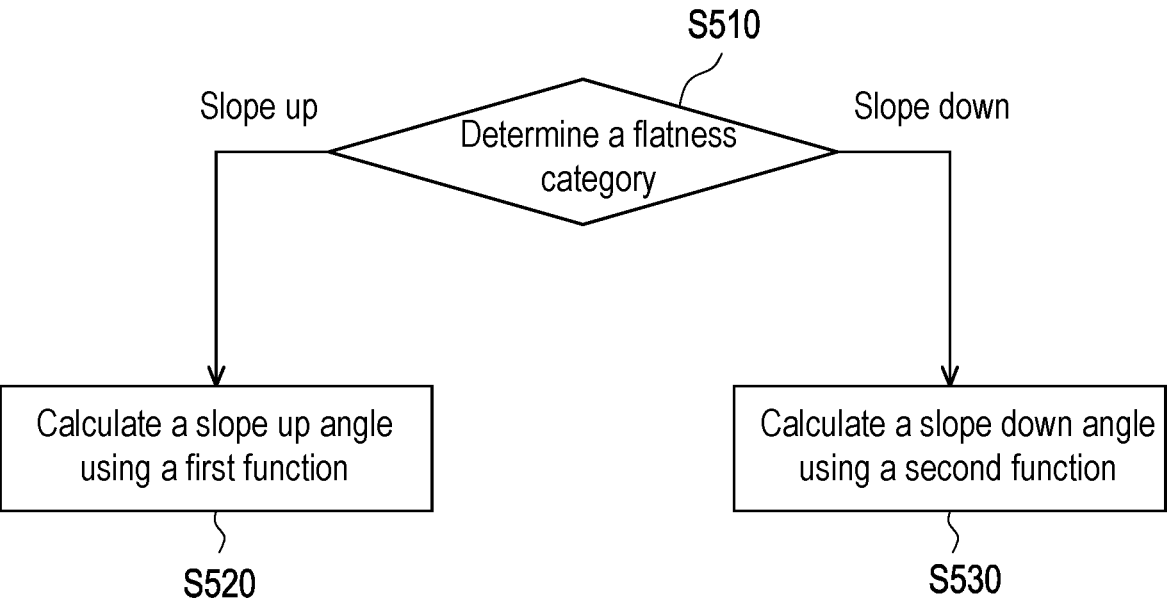
FIG. 5 is a flowchart of angle function decision according to an embodiment of the invention.

FIG. 5 is a flowchart of angle function decision according to an embodiment of the invention. Referring to FIG. 5, the processor 12 may determine the flatness of the region to be measured (such as the region R1 to be measured of FIG. 3)

(step S510). In response to determining that the flatness category of the region to be measured is slope up, the processor 12 may determine the slope up angle of the region to be measured via the first function corresponding to the slope up (step S520). The slope up angle is the upward inclination angle of the region to be measured relative to the flat ground. FIG.

Figure 6A:
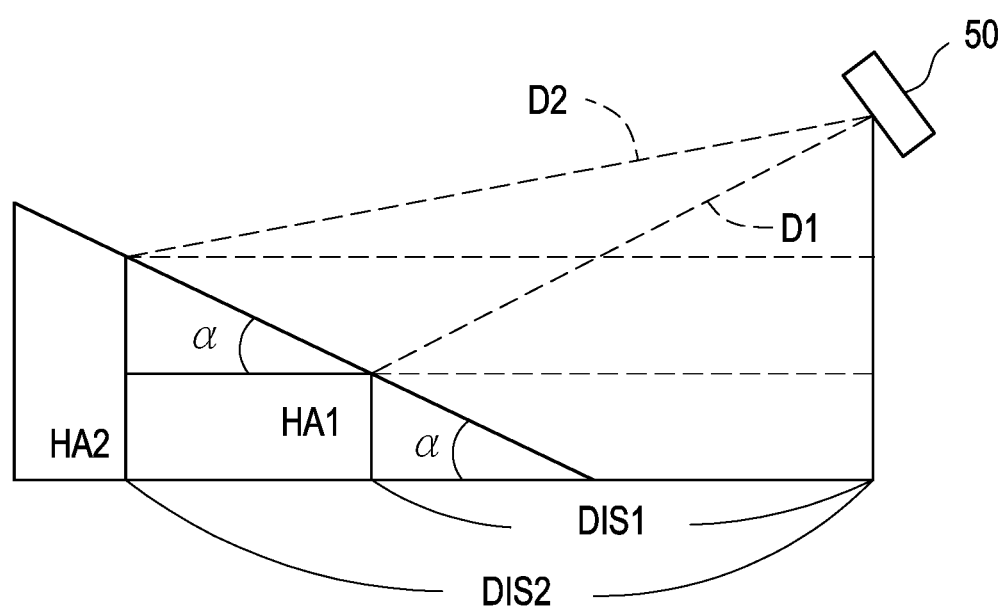
FIG. 6A is a schematic diagram of a slope up angle according to an embodiment of the invention.

6A is a schematic diagram of a slope up angle « according to an embodiment of the invention. Please refer to FIG. 6A, the first function is:

$$\alpha = \tan^{-1} \frac{(HA2 - HA1)}{(DIS2 - DIS1)}, \quad (3)$$

α is the slope up angle, HA1 is the first reference height, HA2 is the second reference height, DIS1 is the first distance (that is, the projection length of the side corresponding to the depth value D1 under the slope up angle α) corresponding to the first reference height, and DIS2 is the second distance (that is, the projection length of the side corresponding to the depth value D2 under the slope up angle «) corresponding to the second reference height. The first reference height HA1 is a statistical value (for example, mean, median, or mode) of height values of all pixels on a horizontal line on the vertical axis. The first reference height HA1 may be greater than 3 cm, such as 3.5 cm, 4 cm, or 5 cm. The second reference height HA2 is a statistical value (for example, mean, median, or mode) of height values of all pixels on another horizontal line on the vertical axis. The second reference height HA2 is greater than the first reference height HA1. The second reference height HA2 may be greater than 5 cm, such as 5.5 cm, 6 cm, or 7 cm.

Figure 6B:
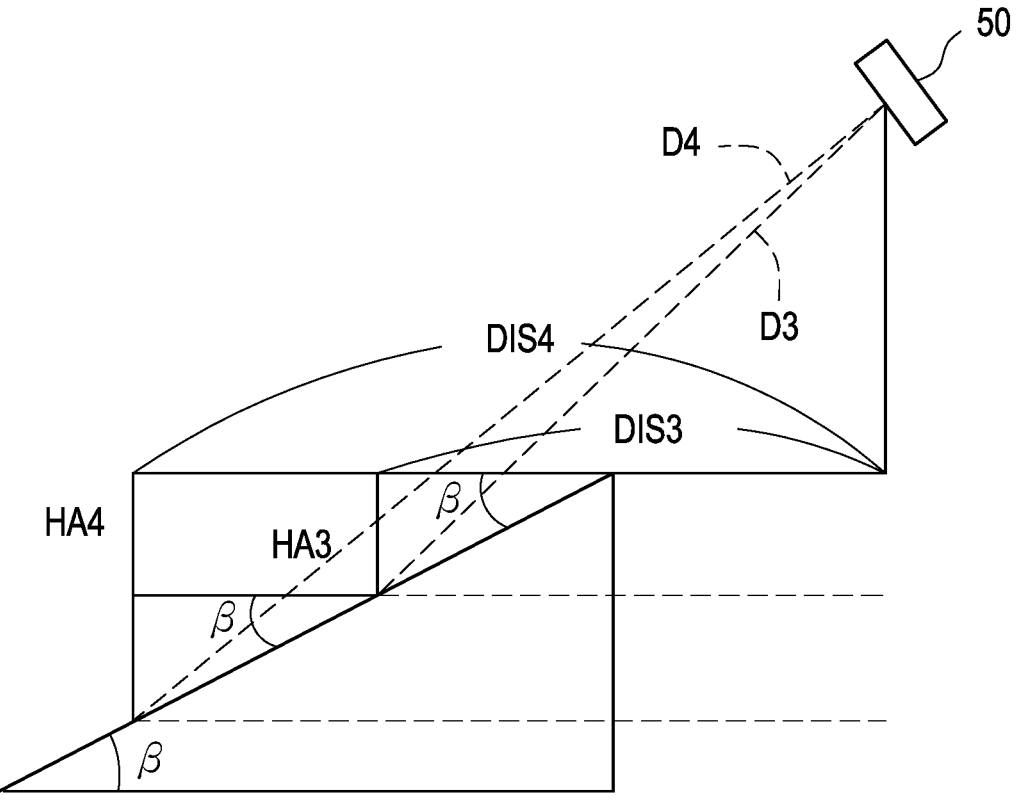
FIG. 6B is a schematic diagram of a slope down angle according to an embodiment of the invention.

In response to determining that the flatness category of the region to be measured is slope down, the processor 12 may determine the slope down angle of the region to be measured via the second function corresponding to the slope down (step S530). The slope down angle is the downward inclination angle of the region to be measured relative to the flat ground. FIG. 6B is a schematic diagram of a slope down angle β according to an embodiment of the invention. Please refer to FIG. 6B, the second function is:

$$\beta = \tan^{-1} \frac{(HA4 - HA3)}{(DIS4 - DIS3)}, \quad$$

β is the slope down angle, HA3 is the third reference height, HA4 is the fourth reference height, DIS3 is the third distance (that is, the projection length of the side corresponding to the depth value D3 under the slope down angle β) corresponding to the third reference height, and DIS4 is the fourth distance (that is, the projection length of the side corresponding to the depth value D4 under the slope down angle β) corresponding to the fourth reference height. The third reference height HA3 is a statistical value (for example, mean, median, or mode) of height values of all pixels on a horizontal line on the vertical axis. The third reference height HA3 may be less than −3 cm, such as −3.5 cm, −4 cm, or −5 cm. The fourth reference height HA4 is a statistical value (for example, mean, median, or mode) of height values of all pixels on another horizontal line on the vertical axis. The fourth reference height HA4 is less than the third reference height HA3. The fourth reference height HA4 may be less than −5 cm, such as −5.5 cm, −6 cm, or −7 cm. Thereby, the inclination of the slope may be known.

In an embodiment, the processor 12 may determine the first reference height and the second reference height or determine the third reference height and the fourth reference height according to the error of the depth camera 50 obtaining the depth information. If the error is smaller, the distance between the horizontal lines corresponding to the first reference height and the second reference height on the vertical axis is larger, or the distance between the horizontal lines corresponding to the third reference height and the fourth reference height on the vertical axis is larger. If the error is larger, the distance between the horizontal lines corresponding to the first reference height and the second reference height on the vertical axis is smaller, or the distance between the horizontal lines corresponding to the third reference height and the fourth reference height on the vertical axis is smaller.

In an embodiment, the processor 12 may generate a control command for controlling the mobile vehicle or other mobile vehicles on which the depth camera 50 is disposed according to the height relation map and the corresponding flatness category thereof. The control command is related to the travel speed, rotation, and/or stop of the mobile vehicle. For example, the protrusion region is divided into 3 centimeters to 5centimeters, 5 centimeters to 8 centimeters, and 8 centimeters or more higher than the flat road. Based on the height relation map, the height and distance (for example, based on the above formulas (1) and (2)) of the protrusion region in front may be obtained correspondingly, and the following three situations may be assumed: (1) for a protrusion region higher than 3 cm to 5 cm, the control command may pass directly without slowing down; (2) for a protrusion region higher than 5 cm to 8 cm, the control command may be:

slow down by half when approaching to a distance of 1 meter from the protrusion region, and stop when approaching to a distance of 0.5 meters from the protrusion region; (3) for a protrusion region higher than at least 8 cm, the control command may be: slow down by half when approaching to a distance of 1.5 meters from the protrusion region, and stop when approaching to a distance of 1 meter from the protrusion region.

For another example, the depression region is divided into 3 centimeters to 5centimeters, 5 centimeters to 8 centimeters, and 8 centimeters or more lower than the flat road. Based on the height relation map, the height and distance of the depression region in front may be obtained correspondingly, and the following three situations may be assumed: (1) for a depression region lower than 3 cm to 5 cm, the control command may pass directly without slowing down; (2) for a depression region lower than 5 cm to 8 cm, the control command may be: slow down by half when approaching to a distance of 1meter from the depression region, and stop when approaching to a distance of 0.5 meters from the depression region; (3) for a depression region lower than at least 8 cm, the control command may be: slow down by half when approaching to a distance of 1.5meters from the depression region, and stop when approaching to a distance of 1 meter from the depression region. A control command may also be to turn to avoid a protrusion or depression region. However, the content of the control command may be adjusted according to actual needs.

Another embodiment of the invention proposes a computer-readable medium recording a computer program loaded into a processor to execute each step (the embodiments shown in FIG. 2 to FIG. 6B) of the above flatness detecting method. The computer program may include a plurality of program codes, and after the processor 12 loads and executes the program codes, the above skeleton calibration method and the functions of the computing apparatus 10 may be implemented.

Based on the above, in the flatness detecting method of road, the computing apparatus, and the computer-readable medium of the embodiments of the invention, the depth information is converted into a height relation map, and the flatness category corresponding to each of the pixels in the height relation map is identified via the semantic segmentation model. In this way, the flatness detection of road may be performed via the depth information of a single depth camera, thereby reducing the number of sensors. An embodiment of the invention may distinguish the types of undulations of the road, and obtain the degree and distance of undulations, so as to assist people or mobile vehicles to travel and avoid accidents. In addition, compared with object detection algorithms, an embodiment of the invention is more applicable to the application scenarios of road detection.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A flatness detecting method of road, comprising:
obtaining depth information, wherein the depth information comprises depth values corresponding to a plurality of pixels;
converting the depth information into a height relation map, wherein a height value of the pixels in the height relation map is converted from a corresponding depth value, and the height value of each of the pixels is related to a height of a ground;
determining flatness categories corresponding to the pixels via a semantic segmentation model according to the height relation map, wherein the semantic segmentation model is trained with an association between at least one reference height and a corresponding flatness category,
determining that a flatness category of a region to be measured is slope up; and
determining a slope up angle of the region to be measured via a first function corresponding to the slope up, wherein the first function is:

$$\alpha = \tan^{-1}\frac{(HA2 - HA1)}{(DIS2 - DIS1)},$$

$\alpha$ is the slope up angle, HA1 is a first reference height, HA2 is a second reference height, DIS1 is a first distance corresponding to the first reference height, and DIS2 is a second distance corresponding to the second reference height.

2. The flatness detecting method of road of claim 1, wherein the step of converting the depth information into the height relation map comprises:
determining a projection height of a depth value of a first pixel in the pixels at a projection angle, wherein the projection angle is obtained based on a position of the first pixel in the pixels; and determining the height value of the first pixel in the height relation map according to a difference between a sensing height and the projection height, wherein the sensing height is a height relative to the ground when the depth information is obtained.

3. The flatness detecting method of road of claim 2, further comprising:
defining a depth value of the first pixel as a length of a first side of a triangle;
defining the projection height as a length of a second side of the triangle; and
defining the projection angle as an included angle between the first side and the second side.

4. The flatness detecting method of road of claim 3, further comprising:
determine a distance of a region to be measured corresponding to the first pixel according to the projection angle and the first side.

5. The flatness detecting method of road of claim 2, further comprising:
obtaining reference depth information, wherein the reference depth information comprises depth values of the pixels when the ground is flat;
matching the reference depth information with a plurality of reference angles to obtain a matching result, wherein each of the pixels in the matching result matches a reference angle; and
determining the projection angle corresponding to the first pixel according to the matching result.

6. The flatness detecting method of road of claim 1, wherein the flatness category predicted by the semantic segmentation model comprises a protrusion, a depression, the slope up, and a slope down.

7. The flatness detecting method of road of claim 1, wherein the step of determining the flatness categories corresponding to the pixels via the semantic segmentation model comprises:
dividing the pixels into a plurality of regions; and
determining flatness categories corresponding to the regions of the pixels respectively via the semantic segmentation model.

8. The flatness detecting method of road of claim 1, further comprising:
determining that a flatness category of a region to be measured is a slope down; and
determining a slope down angle of the region to be measured via a second function corresponding to the slope down, wherein the second function is:

$$\beta = \tan^{-1}\frac{(HA4 - HA3)}{(DIS4 - DIS3)},$$

$\beta$ is the slope down angle, HA3 is a third reference height, HA4 is a fourth reference height, DIS3 is a third distance corresponding to the third reference height, and DIS4 is a fourth distance corresponding to the fourth reference height.

9. The flatness detecting method of road of claim 1, further comprising:
generating a control command for controlling a mobile vehicle according to the height relation map and a corresponding flatness category thereof, wherein the control command is related to at least one of a travel speed, a rotation, and a stop of the mobile vehicle.

10. A computing apparatus, comprising:

a memory storing a program code; and a processor coupled to the memory and loading the program code and executing:

obtaining depth information, wherein the depth information comprises depth values corresponding to a plurality of pixels;

converting the depth information into a height relation map, wherein height values of the pixels in the height relation map are converted from corresponding depth values, and the height value of each of the pixels is related to a height of a ground;

determining flatness categories corresponding to the pixels via a semantic segmentation model according to the height relation map, wherein the semantic segmentation model is trained with an association between at least one reference height and a corresponding flatness category, determining that a flatness category of a region to be measured is a slope up; and determining a slope up angle of the region to be measured via a first function corresponding to the slope up, wherein the first function is:

$$\alpha = \tan^{-1} \frac{(HA2 - HA1)}{(DIS2 - DIS1)},$$

$\alpha$ is the slope up angle, HA1 is a first reference height, HA2 is a second reference height, DIS1 is a first distance corresponding to the first reference height, and DIS2 is a second distance corresponding to the second reference height.

11. The computing apparatus of claim 10, wherein the processor further executes:

determining a projection height of a depth value of a first pixel in the pixels at a projection angle, wherein the projection angle is obtained based on a position of the first pixel in the pixels; and determining the height value of the first pixel in the height relation map according to a difference between a sensing height and the projection height, wherein the sensing height is a height of a depth camera obtaining the depth information relative to the ground.

12. The computing apparatus of claim 11, wherein the processor further executes:

defining the depth value of the first pixel as a length of a first side of a triangle;

defining the projection height as a length of a second side of the triangle; and defining the projection angle as an included angle between the first side and the second side.

13. The computing apparatus of claim 12, wherein the processor further executes:

determining a distance of a region to be measured corresponding to the first pixel according to the projection angle and the first side.

14. The computing apparatus of claim 11, wherein the processor further executes:

obtaining reference depth information, wherein the reference depth information comprises depth values of the pixels when the ground is flat;

matching the reference depth information with a plurality of reference angles to obtain a matching result, wherein each of the pixels in the matching result matches a reference angle; and determining the projection angle corresponding to the first pixel according to the matching result.

15. The computing apparatus of claim 10, wherein the flatness category predicted by the semantic segmentation model comprises a protrusion, a depression, the slope up, and a slope down.

16. The computing apparatus of claim 10, wherein the processor further executes:

dividing the pixels into a plurality of regions; and determining flatness categories corresponding to the regions of the pixels respectively via the semantic segmentation model.

17. The computing apparatus of claim 10, wherein the processor further executes:

determining that a flatness category of a region to be measured is a slope down; and determining a slope down angle of the region to be measured via a second function corresponding to the slope down, wherein the second function is:

$$\beta = \tan^{-1} \frac{(HA4 - HA3)}{(DIS4 - DIS3)},$$

$\beta$ is the slope down angle, HA3 is a third reference height, HA4 is a fourth reference height, DIS3 is a third distance corresponding to the third reference height, and DIS4 is a fourth distance corresponding to the fourth reference height.

18. A non-transitory computer-readable medium, loaded with a program code via a processor to perform the following steps:

obtaining depth information, wherein the depth information comprises depth values corresponding to a plurality of pixels;

converting the depth information into a height relation map, wherein height values of the pixels in the height relation map are converted from corresponding depth values, and the height value of each of the pixels is related to a height of a ground;

determining flatness categories corresponding to the pixels via a semantic segmentation model according to the height relation map, wherein the semantic segmentation model is trained with an association between at least one reference height and a corresponding flatness category, determining that a flatness category of a region to be measured is slope up; and determining a slope up angle of the region to be measured via a first function corresponding to the slope up, wherein the first function is:

$$\alpha = \tan^{-1} \frac{(HA2 - HA1)}{(DIS2 - DIS1)},$$

$\beta$ is the slope up angle, HA1 is a first reference height, HA2 is a second reference height, DIS1 is a first distance corresponding to the first reference height, and DIS2 is a second distance corresponding to the second reference height.

* * * * *